(12) United States Patent
Zmudzinski

(10) Patent No.: US 7,913,018 B2
(45) Date of Patent: Mar. 22, 2011

(54) METHODS AND APPARATUS FOR HALTING CORES IN RESPONSE TO SYSTEM MANAGEMENT INTERRUPTS

(75) Inventor: Krystof Zmudzinski, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 125 days.

(21) Appl. No.: 11/966,357

(22) Filed: Dec. 28, 2007

(65) Prior Publication Data

US 2009/0172233 A1 Jul. 2, 2009

(51) Int. Cl.
*G06F 13/24* (2006.01)
*G06F 1/26* (2006.01)
*G06F 1/32* (2006.01)

(52) U.S. Cl. .......... 710/269; 710/48; 710/260; 710/268; 713/320; 713/324

(58) Field of Classification Search .................. 710/269; 713/320–324
See application file for complete search history.

(56) References Cited

U.S. PATENT DOCUMENTS

| | | | |
|---|---|---|---|
| 6,282,601 B1 * | 8/2001 | Goodman et al. ............ | 710/260 |
| 6,711,642 B2 * | 3/2004 | Huang ......................... | 710/260 |
| 6,968,410 B2 * | 11/2005 | Bennett et al. ................ | 710/260 |
| 7,200,701 B2 * | 4/2007 | Stultz ............................ | 710/267 |
| 7,222,200 B2 * | 5/2007 | Gupta et al. .................. | 710/104 |
| 7,269,629 B2 | 9/2007 | Zmudzinski et al. | |
| 7,363,411 B2 * | 4/2008 | Kobayashi et al. .......... | 710/261 |
| 7,386,647 B2 * | 6/2008 | McFarland et al. .......... | 710/260 |
| 7,433,985 B2 * | 10/2008 | Ayyar et al. .................. | 710/260 |
| 7,464,211 B2 * | 12/2008 | Shah ............................. | 710/267 |
| 7,721,024 B2 * | 5/2010 | Stultz ............................ | 710/48 |
| 7,721,034 B2 * | 5/2010 | Wang et al. .................. | 710/266 |
| 2004/0122949 A1 | 6/2004 | Zmudzinski et al. | |
| 2005/0044048 A1 | 2/2005 | Zmudzinski et al. | |
| 2005/0086405 A1 * | 4/2005 | Kobayashi et al. .......... | 710/260 |
| 2005/0102447 A1 * | 5/2005 | Stultz ............................ | 710/33 |
| 2005/0113069 A1 | 5/2005 | Knauerhase et al. | |
| 2007/0156940 A1 | 7/2007 | Zmudzinski et al. | |
| 2007/0239917 A1 * | 10/2007 | Orita et al. .................... | 710/268 |
| 2007/0266264 A1 | 11/2007 | Lewites et al. | |
| 2007/0266265 A1 | 11/2007 | Zmudzinski et al. | |
| 2007/0271384 A1 | 11/2007 | Zmudzinski et al. | |
| 2009/0037932 A1 * | 2/2009 | Clark et al. ................... | 719/315 |
| 2009/0172229 A1 * | 7/2009 | Zmudzinski ................. | 710/260 |

* cited by examiner

*Primary Examiner* — Brian T Misiura
(74) *Attorney, Agent, or Firm* — Trop, Pruner & Hu, P.C.

(57) ABSTRACT

A method includes halting at least one processing core of a computer system in response to a system management interrupt. The method further includes handling the system management interrupt with at least one other processing core of the computer system in response to determining that the at least one processing core is halted. An associated system and machine readable medium are also disclosed.

15 Claims, 2 Drawing Sheets

METHODS AND APPARATUS FOR HALTING CORES IN RESPONSE TO SYSTEM MANAGEMENT INTERRUPTS

BACKGROUND

A system management interrupt (SMI) is a nonmaskable external interrupt that operates independently from a processor's interrupt- and exception-handling mechanism and a local interrupt controller such as an Intel advanced programmable interrupt controller (APIC). SMIs take precedence over non-maskable and maskable interrupts. SMIs directed to a processing core indicate that a processing core is to transition to system management mode (SMM), which is a special-purpose operating mode provided for handling system-wide functions, such as power management, system hardware control, or proprietary OEM (Original Equipment Manufacturer) designed code, for example.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE DRAWINGS

Figure 1:
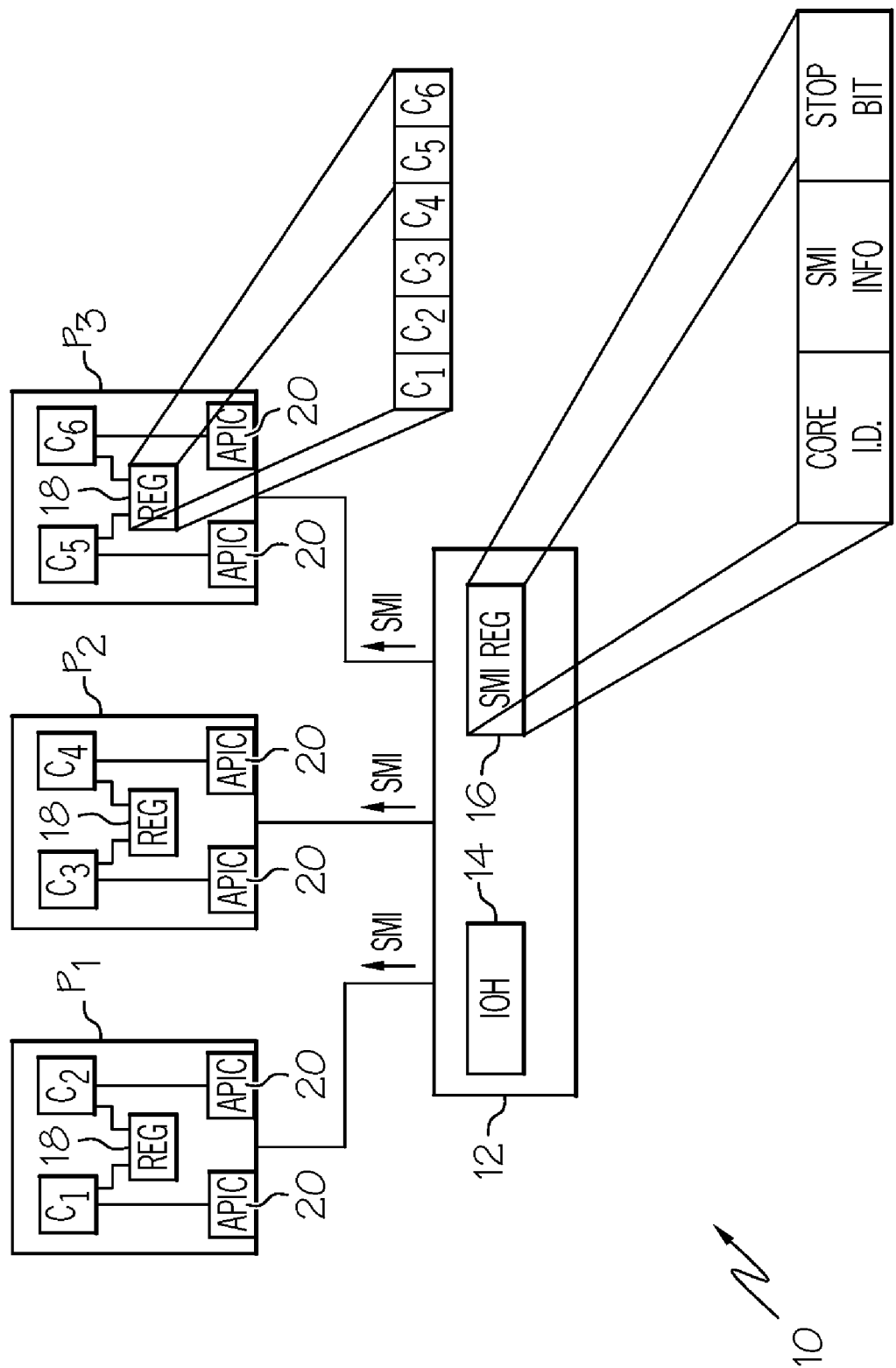
FIG. 1 shows a block diagram of a system having a plurality of processor.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

In the following description, numerous specific details such as types and interrelationships of system components and logic partitioning/integration choices are set forth in order to provide a more thorough understanding of the present disclosure. It will be appreciated, however, by one skilled in the art that embodiments of the disclosure may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; and others.

Referring now to FIG. 1, there is shown an embodiment of a system 10 having a plurality of processors $P_1$-$P_3$ each connected to a chipset 12. A multiprocessor configuration such as that shown in FIG. 1 may be used in variety of applications, such as in a server, for example. The chipset 12 may include various controllers such as an input/output hub (IOH) 14. During operation of the system 10, system management interrupts (SMIs) may be delivered to the various processors $P1$-$P_3$. SMIs may be generated within the system 10 by various controllers, such as the input/output hub 14, for example, or other components. An SMI may instruct processing cores in a system, such as system 10, to enter system management mode (SMM).

As shown in FIG. 1, the processors $P_1$-$P_3$ may each include a plurality of processing cores, which may be a hardware thread, a logical core, or a physical core. Each core may operate independently from one another. Each processor $P_1$-$P_3$ is illustratively shown as including two cores designated as "$c_n$." However, it should be appreciated that each processor may include a number of cores other than that illustratively shown in FIG. 1. When the system 10 enters SMM, each of these cores $c_1$-$c_6$ may be synchronized if all are to transition to SMM. However, this may typically take more time than desired as each core is synchronized and transitioned into SMM. Furthermore, conditions may exist when less than all of the cores need to be transitioned to SMM. Conditions may also exist in which only a single core needs to be transitioned to SMM to carry out instructions contained in SMI handler code. Cores not needing to be transitioned to SMM may instead be halted in their operation, thus conserving time that would be spent saving a current state of a core before transitioning to SMM.

In one embodiment, an SMI may be handled by one particular core in the system 10. As shown in FIG. 1, the chipset may include a register 16 for storing various information, such as SMI information. The register 16 may also include the identification of the core (Core I.D.) selected to handle the SMI. The register may also include a stop bit to indicate if other cores in should be stopped while an SMI is handled.

In one embodiment, a register 18 is included in the each processor $P_1$-$P_3$. Each register 18 includes a number of bits such that each bit corresponds to a specific core, as illustrated in regard to the register 18 of processor $P_3$. During operation, a bit may be set to high (logic 1) in each register 18 to indicate an associated core has halted. In one embodiment, a core executing SMI handler code may proceed with accessing shared resources once all other cores are halted. In another embodiment, a core may not start executing SMI handler code until all other cores are stopped.

When an SMI is to be directed to a particular core, the register 16 may be loaded with the identification of the core to be selected to handle an SMI along with the SMI vector. The SMI may be transmitted to each processor $P_1$-$P_3$, as illustratively shown in FIG. 1. Each core may include a local interrupt controller, such as a local Intel advanced programmable interrupt controller (APIC) 20. Each local APIC 20 will inspect an SMI to determine whether the SMI should be delivered to a corresponding core or whether the core should be stopped. If a core is to handle an SMI, the associated APIC 20 directs the SMI contents to the selected core. For example, in FIG. 1, core $c_3$ of the processor $P_1$ may be selected to handle an SMI. The SMI will be inspected by the local APIC 20 of core $c_3$ and it will be determined that the SMI is to be handled by the core $c_3$. The local APICs 20 associated with the other cores will inspect the SMI and determine that none of their associated cores will be handling the SMI.

The selected core $c_3$ will inspect its particular register 18 before accessing system 10 or other outside resources. As each non-selected core is halted, its corresponding bit in the registers 18 will be set. In one embodiment, the bit is set to a logic high (=1). Each processor may transmit data to other processors notifying them of when its particular cores are halted such that the registers 18 in each processor may be set accordingly. After all cores are appropriately halted and the core $c_3$ is aware of the halting, the core $c_3$ may execute the SMI. It should be appreciated that this example using the core $c_3$ may occur for any core(s) in the system 10. In another embodiment, the selected core, such as core c3, may enter SMM after all of the bits associated with the halted cores are set in the registers 18. This removes the responsibility of monitoring the register 18 from the SMI handler code of the selected core.

After the core(s) selected to handle the SMI performs the associated instruction, the selected core may invoke a resume mechanism. In one embodiment, this may be performed by another SMI being sent to each processor, which the local APIC's 20 process and execute. The resume SMI may be sent by the selected core(s). Each local APIC 20 will cause its associated halted core to resume operating and will reset the associated register 18. In one embodiment, virtualization hardware may be enabled, in which case the resume mechanism may not be invoked. Instead, a virtual machine (VM) entry may be invoked. A resume SMI may also be broadcast to all cores.

Figure 2:
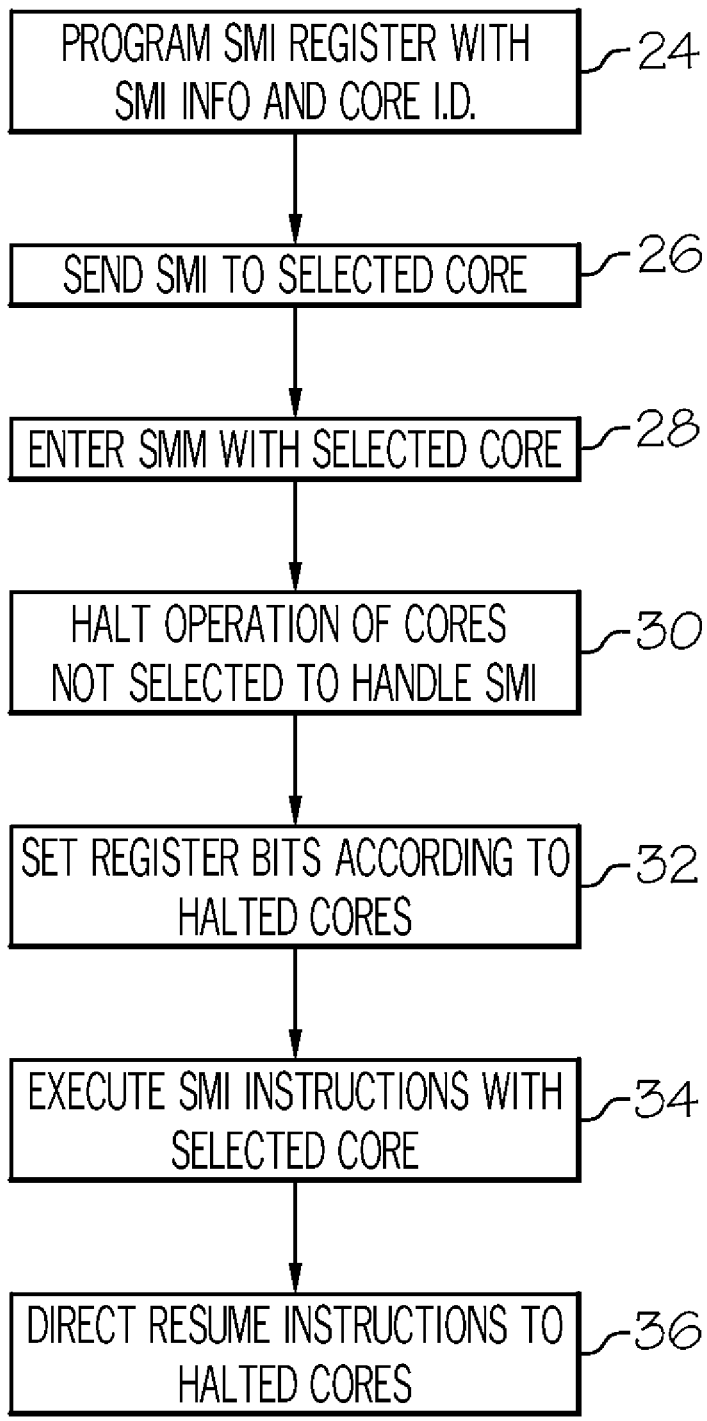
FIG. 2 shows a flowchart shown a method of handling system management interrupts.

Referring now to FIG. 2, there is shown a flowchart 22 showing a method for handling an SMI in a system, such as the system 10. Operation 24 includes programming an SMI register with SMI information and a core identifier. As discussed in regard to FIG. 1, in one embodiment the register 16 may be set to include the identifier of a core selected to handle an SMI in the system 10. The register 16 may also include the SMI information, such as a hint that may be provided to the SMI handler. In one embodiment, a stop bit of register 16 may also be set to indicate if other cores should be stopped while the SMI is being handled by the a selected core. The method may further include operation 26 which includes sending the SMI to the selected core. In one embodiment, this may be done by transmitting the SMI to each processor $P_1$-$P_3$ in a system 10, which allows each local APIC 20 associated with a core to inspect the SMI to determine if the core identification matches its associated core. If the local APIC 20 determines that its associated core is the selected one, the SMI is directed to that particular core and it enters SMM.

Operation 30 may include halting the cores not selected to handle the SMI. In one embodiment, this may be done through an associated local APIC, such as a local APIC 20 as discussed in regard to FIG. 1. Operation 32 includes setting a register according to the halted cores. In one embodiment, this may be done by setting each bit in the registers 18 associated with each core halted in operation. The cores instructed to halt in operation may complete any outstanding instructions before halting. In one embodiment, the core selected to handle the SMI may monitor its associated register 18 until all of the bits are set, at which point it may proceed. Operation 34 includes executing the SMI instructions with the selected core once the appropriate bits in the registers 18 are set indicating all non-selected cores are halted. Operation 36 includes invoking a resume mechanism by the halted cores. In one embodiment, the resume mechanism may be generated by the core selected to handle the SMI. In one embodiment, the resume mechanism may be a separate SMI generated by the selected core, or may be part of the original SMI instructions.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

What is claimed is:

1. A method comprising
halting at least one processing core of a computer system including a processor comprising a plurality of processing cores and a plurality of interrupt controllers, each interrupt controller associated with one of the plurality of processing cores and each interrupt controller to receive a system management interrupt comprising interrupt information and a core identifier of a system management interrupt configuration register to store an interrupt vector and a core identifier for a system management interrupt, to halt the associated processing core if the associated processing core does not correspond to the core identifier of the system management interrupt, and to cause the associated processing core to execute a handler associated with the interrupt vector of the system management interrupt if the associated processing core corresponds to the core identifier of the system management interrupt, in response to the system management interrupt, and in response to halting the at least one processing core, setting a corresponding bit of a halt status register that comprises a bit for each processing core of the computer system, and
handling the system management interrupt with at least one other processing core of the computer system in response to determining that the at least one processing core is halted, including starting the handling of the system management interrupt with the at least one other processing core in response to the halt status register indicating all processing cores besides the at least one other processing core have been halted, wherein the handling is to cause the at least one other processing core to wait for the halt status register to indicate that the at least one processing core has halted before proceeding with the system management interrupt handling.

2. The method of claim 1, wherein
halting comprises halting all processing cores of the computer system not identified by the system management interrupt, and
handling comprises handling the system management interrupt with a processing core identified by the system management interrupt.

3. The method of claim 1, further comprising resuming the at least one processing core after the at least one other processing core finishes handling the system management interrupt.

4. The method of claim 1, wherein
halting the at least one processing core causes the at least one processing core to forego entry into a system management mode, and
handling the system management interrupt causes the at least one other processing core to enter into the system management mode.

5. The method of claim 1, further comprising assigning a core identifier to the system management interrupt, wherein
the halting of the at least one processing core comprises determining that the core identifier associated with the system management interrupt does not correspond to the at least one processing core, and
handling the system management interrupt with the at least one other processing core comprises determining that the core identifier associated with the system management interrupt corresponds to the at least one other processing core.

6. A system comprising
a system management interrupt configuration register to store an interrupt vector and a core identifier for a system management interrupt, and
a processor comprising a plurality of processing cores and a plurality of interrupt controllers, each interrupt controller associated with one of the plurality of processing cores and each interrupt controller to receive a system management interrupt comprising interrupt information and the core identifier of the system management interrupt configuration register, to halt the associated processing core if the associated processing core does not correspond to the core identifier of the system management interrupt, and to cause the associated processing core to execute a handler associated with the interrupt vector of the system management interrupt if the associated processing core corresponds to the core identifier of the system management interrupt, wherein the processor further comprises a halt status register to track which processing cores of the system are halted, and the halt status register is updated after a processing core halts, and the handler is to cause the processing core corresponding to the core identifier to wait for the halt status register to indicate that the other processing cores have halted before proceeding with handling of the system management interrupt.

7. The system of claim 6 wherein the interrupt controller associated with a processing core selected to execute a handler waits for the halt status register to indicate that the other processing cores have halted before causing the associated processing core corresponding to the core identifier of the system management interrupt to begin execution of the handler.

8. The system of claim 6 further comprising
another processor comprising a plurality of processing cores and a plurality of interrupt controllers, each interrupt controller associated with one of the plurality of processing cores, each interrupt controller to receive a system management interrupt comprising the interrupt vector and the core identifier of the system management interrupt configuration register, to halt an associated processing core of the another processor if the associated processing core does not correspond to the core identifier of the system management interrupt, and to cause an associated processing core of the another processor to execute a handler associated with the interrupt vector of the system management interrupt if the associated processing core corresponds to the core identifier of the system management interrupt.

9. The system of claim 8 wherein the processor and the another processor each comprises a halt status register to track which processing cores of the system are halted, wherein each halt status register is updated after a processing core halts.

10. The system of claim 8 wherein
the processing core corresponding to the core identifier of the system management interrupt resides in the processor,
each interrupt controller of the another processor halts an associated processing core of the another processor in response to receiving the system management interrupt,
wherein, the halt status register of the processors is to reflect the processing cores of the another processor have halted, and
the interrupt controller of the associated processing core corresponding to the core identifier waits for the halt status register to indicate that the other processing cores of the system have halted before causing the associated processing core that corresponds to the core identifier of the system management interrupt to begin execution of the handler.

11. A machine readable medium having stored thereon a plurality of instructions, that in response to being executed, result in:
a computing device, including a processor comprising a plurality of processing cores and a plurality of interrupt controllers, each interrupt controller associated with one of the plurality of processing cores and each interrupt controller receiving a system management interrupt comprising interrupt information and a core identifier of a system management interrupt configuration register to store an interrupt vector and a core identifier for a system management interrupt, halting the associated processing core if the associated processing core does not correspond to the core identifier of the system management interrupt, and causing at least one other processing core to execute a handler associated with the interrupt vector of the system management interrupt if the at least one other processing core corresponds to the core identifier of the system management interrupt;
halting the associated processing core of the computer device in response to the system management interrupt, and in response to halting the associated processing core, setting a corresponding bit of a halt status register that comprises a bit for each processing core of the computer system, and
handling the system management interrupt with the at least one other processing core of the computer system in response to determining that the associated processing core is halted, including starting the handling of the system management interrupt with the at least one other processing core in response to the halt status register indicating all processing cores besides the at least one other processing core have been halted, wherein the handling is to cause the at least one other processing core to wait for the halt status register to indicate that the associated processing core has halted before proceeding with the system management interrupt handling.

12. The machine readable medium of claim 11, wherein the plurality of instructions further result in a computing device halting all processing cores of the computer system not identified by the system management interrupt, and
handling the system management interrupt with a processing core identified by the system management interrupt.

13. The machine readable medium of claim 11, wherein the plurality of instructions further result in the computing device resuming the associated processing core after the at least one other processing core finishes handling the system management interrupt.

14. The machine readable medium of claim 11, wherein the plurality of instructions further result in the computing device halting the associated processing core causing the associated processing core to forego entry into a system management mode, and handling the system management interrupt causing the at least one other processing core to enter into the system management mode.

15. The machine readable medium of claim 11, wherein the plurality of instructions further result in the computing device determining that the core identifier associated with the system management interrupt does not correspond to the associated processing core, and determining that the core identifier associated with the system management interrupt corresponds to the at least one other processing core.

* * * * *